(12) United States Patent
Hesse et al.

(10) Patent No.: US 8,180,947 B2
(45) Date of Patent: May 15, 2012

(54) USB ON-THE-GO CONTROLLER

(75) Inventors: Kay Hesse, Dresden (DE); Sven Mueller, Dresden (DE)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1598 days.

(21) Appl. No.: 11/230,979

(22) Filed: Sep. 20, 2005

(65) Prior Publication Data

US 2006/0095642 A1 May 4, 2006

(30) Foreign Application Priority Data

Oct. 29, 2004 (DE) .......................... 10 2004 057 756

(51) Int. Cl.
*G06F 13/20* (2006.01)
(52) U.S. Cl. ....................................... 710/313
(58) Field of Classification Search .................... 710/313
See application file for complete search history.

(56) References Cited

U.S. PATENT DOCUMENTS

| | | | |
|---|---|---|---|
| 6,199,137 B1 * | 3/2001 | Aguilar et al. ................. | 710/305 |
| 6,434,651 B1 * | 8/2002 | Gentry, Jr. .................... | 710/260 |
| 6,675,305 B1 | 1/2004 | Mohammad | |
| 6,732,218 B2 * | 5/2004 | Overtoom et al. ............ | 710/313 |
| 6,874,055 B2 * | 3/2005 | Chiang et al. ................. | 710/316 |
| 6,912,060 B1 | 6/2005 | Luciano et al. | |
| 7,028,109 B2 * | 4/2006 | Saito et al. ....................... | 710/33 |
| 7,191,277 B2 * | 3/2007 | Broyles .......................... | 710/316 |
| 2003/0177297 A1 | 9/2003 | Hesse | |
| 2003/0204652 A1 | 10/2003 | Saito et al. | |
| 2004/0024920 A1 | 2/2004 | Gulick et al. | |
| 2004/0153597 A1 * | 8/2004 | Kanai et al. ..................... | 710/305 |
| 2005/0216650 A1 * | 9/2005 | Tjia et al. ....................... | 710/316 |
| 2006/0064521 A1 * | 3/2006 | Lin .................................. | 710/60 |

FOREIGN PATENT DOCUMENTS

| | | |
|---|---|---|
| JP | 2002-288112 | 10/2002 |
| JP | 2003-323226 | 11/2003 |
| JP | 2003-323396 | 11/2003 |
| JP | 2003323226 | 11/2003 |

(Continued)

OTHER PUBLICATIONS

Structured Computer Organization, Third Edition Andrew S. Tanenbaum pp. 11-13 1990.*

(Continued)

*Primary Examiner* — Paul R Myers
(74) *Attorney, Agent, or Firm* — Meyertons, Hood, Kivlin, Kowert & Goetzel, P.C.

(57) ABSTRACT

A USB (Universal Serial Bus) controller technique for implementing OTG (On-The-Go) functionality is provided. The device may have an EHCI (Enhanced Host Controller Interface) compliant host control unit, and an OTG control unit to implement an OTG state machine partly in hardware and partly in software. The OTG control unit may have an OTG control register and an OTG status register which are accessible by software. Further, the USB controller device may have a device control unit to implement device functionality and a port multiplexer to assign a physical port to either the host or the device control unit. The OTG control unit may be comprised in the port multiplexer. Further, a software driver may read the OTG status register in response to receiving an interrupt from the USB controller device, and write to the OTG control register to force the USB controller device to change its OTG state.

7 Claims, 4 Drawing Sheets

FOREIGN PATENT DOCUMENTS

| | | |
|---|---|---|
| JP | 2004-504182 | 2/2004 |
| WO | 03029998 | 4/2003 |
| WO | 2003-107199 | 12/2003 |
| WO | 03107199 | 12/2003 |
| WO | 2004/012090 | 2/2004 |

OTHER PUBLICATIONS

OpenHCI Open Host Controller Interface Specification for USB revision 1.0a Sep. 14, 1999.*

On-The-Go Supplement to the USB 2.0 Specification Revision 1.0 Dec. 18, 2001.*

Enhanced Host Controller Interface Specification for Universal Serial Bus Revision 1.0 Mar. 12, 2002.*

International search report and Written Opinion for application No. PCT/US2005/043396 mailed Jun. 13, 2006.

Von Srinivas Yarra; "On the Go—USB-Gerläte ohne Host betreiben Erweiterung Des USB—2.0—Standards"; Elektronik; Mar. 4, 2003; pp. 70-74; vol. 52, No. 5; Weka Fachzeitschriftenverlag; Poing, DE.

Translation of Office Communication in application DE 10 2004 057 756.0 issued Aug. 31, 2005.

Office action in Korean Patent Application No. 10-2007-7012156 dated Aug. 9, 2011.

Japanese Laid-Open Patent Publication No. 2003-323396 (Nov. 14, 2003).

Final Office Action dated Nov. 2, 2011; Japanese Application No. 2007-544489; 6 pages.

English Translation of JP Publication No. 2003-323396; published Nov. 14, 2003; 48 pages.

English Translation of JP Publication No. 2003-323226; published Nov. 14, 2003; 84 pages.

Yoji Sato and Masahiko Kuwano; "Configuration of Hardware and Software of USB Device"; Interface Oct. 2004; Issue 10, vol. 30, Serial vol. 328; CQ Publishing Co., Ltd.; Aug. 31, 2004; pp. 52-59.

Office action in Japanese Patent Application No. 2007-544489 mailed Apr. 13, 2011.

Sato, et al: "Configuration of Hardware and Software of USB Device"; Interface Oct. 2004, CQ Publishing Co., Ltd., Aug. 31, 2004; pp. 52 to 59, issue 10, vol. 30 (serial vol. 328).

* cited by examiner

USB ON-THE-GO CONTROLLER

BACKGROUND OF THE INVENTION

1. Field of the Invention

The invention generally relates to USB (Universal Serial Bus) controller devices and methods, and in particular to implementing OTG (On-The-Go) functionality.

2. Description of the Related Art

The Universal Serial Bus was originally developed in 1995 to define an external expansion bus which facilitates the connection of additional peripherals to a computer system. The USB technique is implemented by PC (Personal Computer) host controller hardware and software and by peripheral friendly master-slave protocols and achieves robust connections and cable assemblies. USB systems are extendable through multi-port hubs.

In USB systems, the role of the system software is to provide a uniformed view of the input/output architecture for all applications software by hiding hardware implementation details. In particular, it manages the dynamic attach and detach of peripherals and communicates with the peripheral to discover its identity. During run time, the host initiates transactions to specific peripherals, and each peripheral accepts its transactions and response accordingly.

Hubs are incorporated to the system to provide additional connectivity for USB peripherals, and to provide managed power to attached devices. The peripherals are slaves that must react to request transactions sent from the host. Such request transactions include requests for detailed information about the device and its configuration.

While these functions and protocols were already implemented in the USB 1.1 specification, this technique was still improved in order to provide a higher performance interface. FIG. 1 illustrates an example USB 2.0 system that comprises a host controller 100, a number of USB devices 115, 120, 125, 130, and two hubs 105, 110. In the system of FIG. 1, the hubs 105, 110 are introduced for increasing connectivity, but in other USB 2.0 systems, the USB devices can be connected directly to the host controller 100.

As mentioned above, USB 2.0 provides a higher performance interface, and the speed improvement may be up to a factor of 40. Moreover, as apparent from FIG. 1, USB 2.0 is backwards compatible with USB 1.1 because it allows for connecting USB 1.1 devices 120, 125, 130 to be driven by the same host controller 100. There may even be used USB 1.1 hubs 110.

As can be seen from FIG. 1, a USB 1.1 device 120 can be connected directly to a USB 2.0 hub 105. Moreover, it can also be connected directly to the host controller 100. This is made possible by the capability of USB 2.0 host controllers and hubs to negotiate higher as well as lower transmission speeds on a device-by-device basis.

Turning now to FIG. 2, the system software and hardware of a USB 2.0 system is illustrated. The system components can be organized hierarchically by defining several layers as shown in the figure.

In the uppermost layer, the client driver software 200 executes on the host PC and corresponds to a particular USB device 230. The client software is typically part of the operating system or provided with the device.

The USB driver 205 is a system software bus driver that abstracts the details of the particular host controller driver 210, 220 for a particular operating system. The host controller drivers 210, 220 provide a software layer between a specific hardware 215, 225, 230 and the USB driver 205 for providing a driver-hardware interface.

While the layers discussed so far are software implemented, the uppermost hardware component layer includes the host controllers 215, 225. These controllers are connected to the USB device 230 that performs the end user function.

As apparent from the figure, there is one host controller 225 which is an enhanced host controller (EHC) for the high speed USB 2.0 functionality. This host controller operates in compliance with the EHCI (Enhanced Host Controller Interface) specification for USB 2.0. On the software side, host controller 225 has a specific host controller driver (EHCD) 220 associated.

Further, there are host controllers 215 for full and low speed operations. The UHCI (Universal Host Controller Interface) or OHCI (Open Host Controller Interface) are the two industry standards applied in the universal or open host controllers (UHC/OHC) 215 for providing USB 1.1 host controller interfaces. The host controllers 215 have assigned universal/open host controller drivers (UHCD/OHCD) 210 in the lowest software level.

Thus, the USB 2.0 compliant host controller system comprises driver software and host controller hardware which must be compliant to the EHCI specification. While this specification defines the register-level interface and associated memory-resident data structures, it does not define nor describe the hardware architecture required to build a compliant host controller.

Referring now to FIG. 3, the hardware components of a common motherboard layout are depicted. The basic elements found on a motherboard may include the CPU (Central Processing Unit) 300, a northbridge 305, a southbridge 310, and system memory 315. The northbridge 305 is usually a single chip in a core-logic chipset that connects the processor 300 to the system memory 315 and the AGP (Accelerated Graphic Port) and PCI (Peripheral Component Interface) buses. The PCI bus is commonly used in personal computers for providing a data path between the processor and peripheral devices like video cards, sound cards, network interface cards and modems. The AGP bus is a high-speed graphic expansion bus that directly connects the display adapter and system memory 315. AGP operates independently of the PCI bus. It is to be noted that other motherboard layouts exist that have no northbridge in it, or that have a northbridge without AGP or PCI options.

The southbridge 310 is usually the chip in a system core-logic chipset that controls the IDE (Integrated Drive Electronics) or EIDE (Enhanced IDE) bus, the USB bus, that provides plug-n-play support, controls a PCI-ISA (Industry Standard Architecture) bridge, manages the keyboard/mouse controller, provides power management features, and controls other peripherals.

USB functionality is often implemented in a southbridge device or in other companion chips that may be part of a personal computer's chipset. As described above, this functionality provides a popular interface for exchanging data between the computer that has built in the southbridge or companion chip, and peripherals.

In order to allow low-power devices to have limited host capabilities, the "On-The-Go Supplement to the USB 2.0 Specification" has been drafted. The supplement defines two protocols: SRP (Session Request Protocol), which lets a peripheral device ask the host to turn on the USB power, and HNP (Host Negotiation Protocol), which lets a peripheral device become the USB host. Thus, the supplement to the USB 2.0 specification allows a portable device to take on the role of a limited USB host without the burden of supporting all of the USB functions of a personal computer.

Besides others, the OTG supplement specifies dual-role devices that may be operated in full speed (and optionally in high speed) as peripheral, and further in full speed (and optionally in low and high speed) as host. Further, an A-device is specified to be a host at the start of a session. Under certain conditions, the A-device will relinquish the role of host to a dual-role B-device. A B-device is a peripheral at the start of a session. If the device is dual-role, it may be granted the role of host from the A-device.

The two protocols mentioned above, SRP and HNP, are described in the OTG supplement by means of state diagrams. These state diagrams define a plurality of OTG states and the conditions under which transitions between these states occur. However, implementing state machine(s) to comply with the state diagrams specified in the OTG supplement is generally found to be quite complex. In particular, implementing the state machine(s) may require modifications to the circuits providing the conventional USB functionality. This may lead to increased circuit development and manufacturing costs.

SUMMARY OF THE INVENTION

An improved USB controller technique for implementing OTG functionality is provided that may be realized with reduced development and manufacturing costs.

In one embodiment, a USB controller device having OTG functionality is provided. The USB controller device comprises a host controller unit having an EHCI compliant host controller adapted to implement host functionality to perform data transfer to and/or from at least one USB peripheral device. The USB controller device further comprises an OTG control unit that is adapted to implement an OTG state machine to control operation of the host control unit. The OTG control unit is adapted to implement the OTG state machine partly in hardware and partly in software.

In another embodiment, a USB controller device is provided that has OTG functionality. The USB controller device comprises a host control unit that has an EHCI compliant host controller which is adapted to implement host functionality to perform data transfer and/or from at least one USB peripheral device. The USB controller device further comprises an OTG control unit that is adapted to control operation of the host control unit. The OTG control unit comprises an OTG control register that holds control information to control operation of the OTG control unit, and an OTG status register that holds status information of the OTG control unit. The OTG control and status registers are accessible by software.

According to a further embodiment, a USB controller device comprises a host control unit that has an EHCI compliant host controller which is adapted to implement host functionality to perform data transfer to and/or from at least one USB peripheral device. The USB controller device further comprises a device control unit which is adapted to implement device functionality to perform data transfer to and/or from at least one USB host device. Moreover, the USB controller device comprises a port multiplexer which is adapted to assign a physical port to either the host control unit or the device control unit, and an OTG control unit which is adapted to implement OTG functionality. The OTG control unit is comprised in the port multiplexer.

In still a further embodiment, a computer-readable storage medium stores instructions that, when executed on a processor, cause the processor to drive a USB controller device that has OTG functionality by implementing at least a part of an OTG state machine to control operation of an EHCI compliant host controller.

According to yet another embodiment, a computer-readable storage medium stores instructions that, when executed on a processor, cause the processor to drive a USB controller device that has OTG functionality by accessing OTG control and status registers of the USB controller device. The OTG control and status registers hold OTG control and status information which is suitable for implementing the OTG functionality.

Furthermore, an embodiment provides a method of providing OTG functionality in a USB controller device that has an OTG control register and an OTG status register which are both accessible by a software driver. The method comprises reading, by the software driver, the OTG status register in response to receiving an interrupt from the USB controller device, and writing, by the software driver, to the OTG control register to force the USB controller device to change its OTG state.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings wherein like elements and structures are indicated by like reference numbers.

Figure 1:
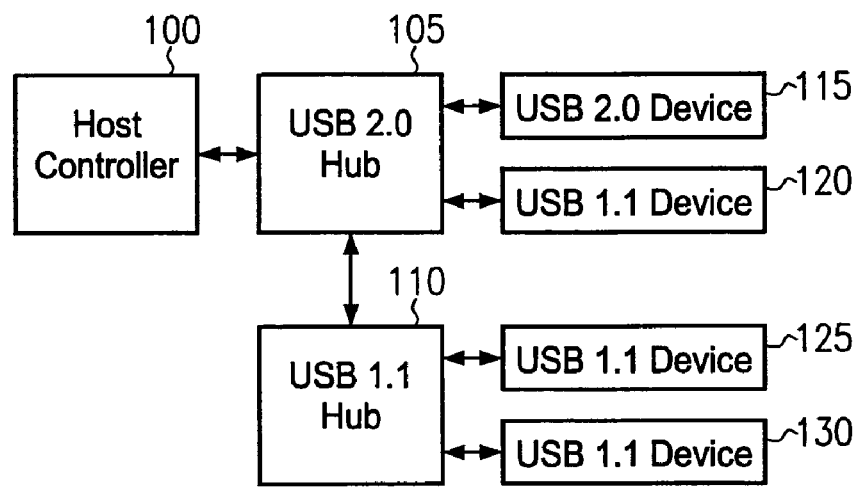
FIG. 1 illustrates an example USB 2.0 compliant system.
Figure 2:
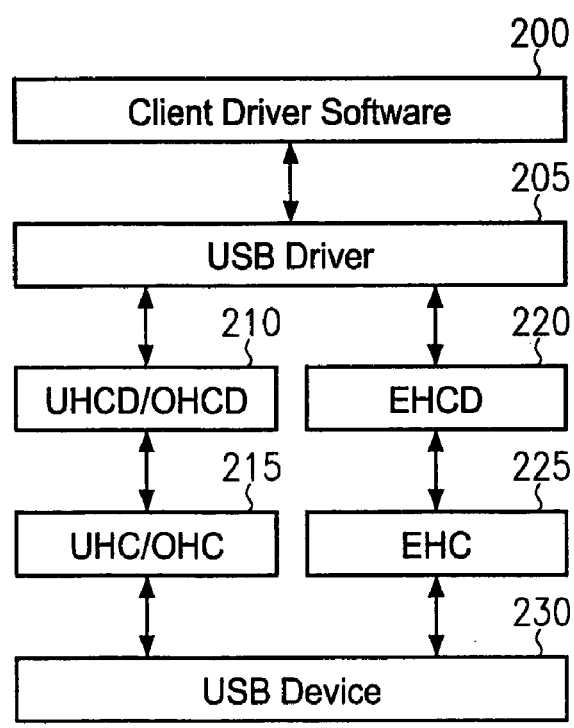
FIG. 2 illustrates the hardware and software component layers in the system of FIG. 1.
Figure 3:
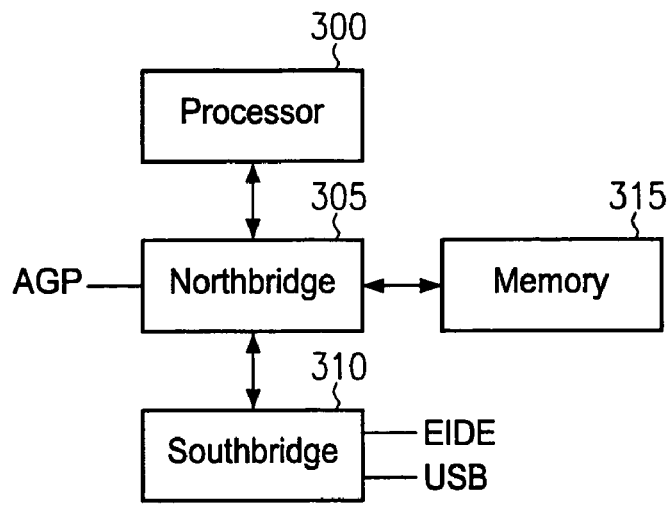
FIG. 3 illustrates a common motherboard layout.
Figure 4:
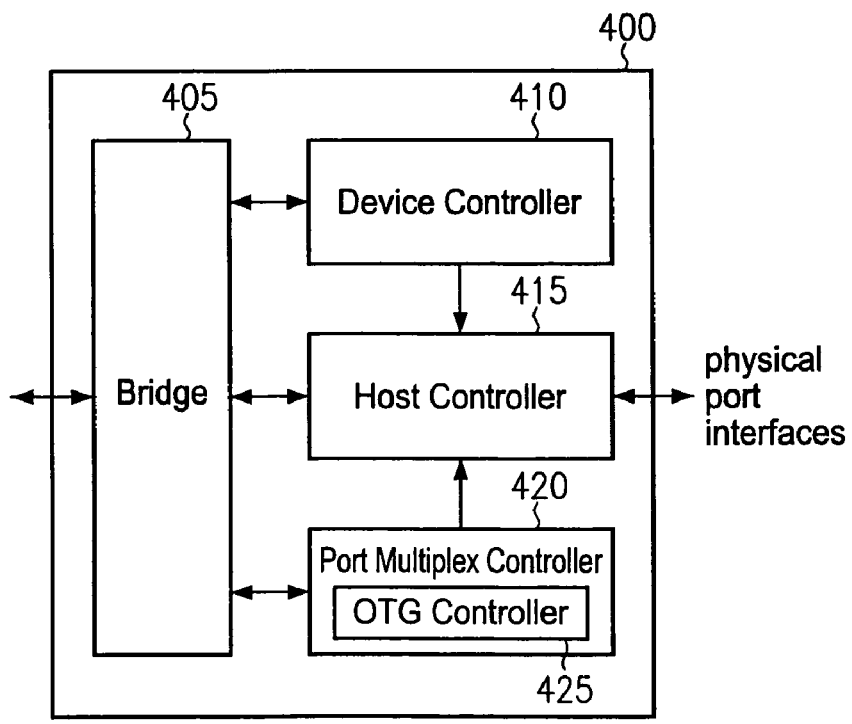
FIG. 4 is a block diagram illustrating the components of a USB controller device having OTG functionality, according to an embodiment.

Referring now to the drawings and in particular to FIG. 4, a USB controller device 400 according to an embodiment comprises a host control unit 415, a device control unit 410, a bridge 405, and a port multiplex controller 420. The port multiplex controller 420 of the present embodiment comprises an OTG controller 425 that implements OTG functionality to the USB controller device 400. As will be apparent from the description below, adding the OTG controller 425 to the port multiplex controller 420 allows for achieving OTG functionality with least efforts since standard or off-the-shelf circuits may be used to implement the host and device control units 415, 410 with only little extra hardware.

In the present embodiment, the host control unit 415 is an EHC/OHC combination, and the port multiplex controller 420 controls access of the host control unit 415 and the device control unit 410 to the shared physical port. As will be described in more detail below, the host control unit 415 comprises port route facilities for this purpose. The device control unit 410 is connected to the host control unit 415 by means of a device UTMI (USB 2.0 Transceiver Macrocell Interface) interface.

The bridge 405 may be applicable in a broad range of applications and may further be not restricted to the USB 2.0 subsystem of the present embodiment. The main task of bridge 405 is to convert bus protocols. Additionally, it may serve as an arbiter or decoder to map multiple ports of one protocol to one port of another protocol. In the present embodiment, the multiple ports may be non-packetized bus ports with burst and split operations, while the other port may be strictly packetized.

The device control unit 410 is used to implement device functionality to perform data transfer to and/or from a USB host device. The device control unit 410 may support multiple bidirectional logical endpoints.

The host control unit 415 is used to implement host functionality to perform data transfer to and/or from one or more USB peripheral devices. As will be discussed in the following, the host control unit 415 may support two (or more) USB ports, one EHC and one OHC companion controller.

Figure 5:
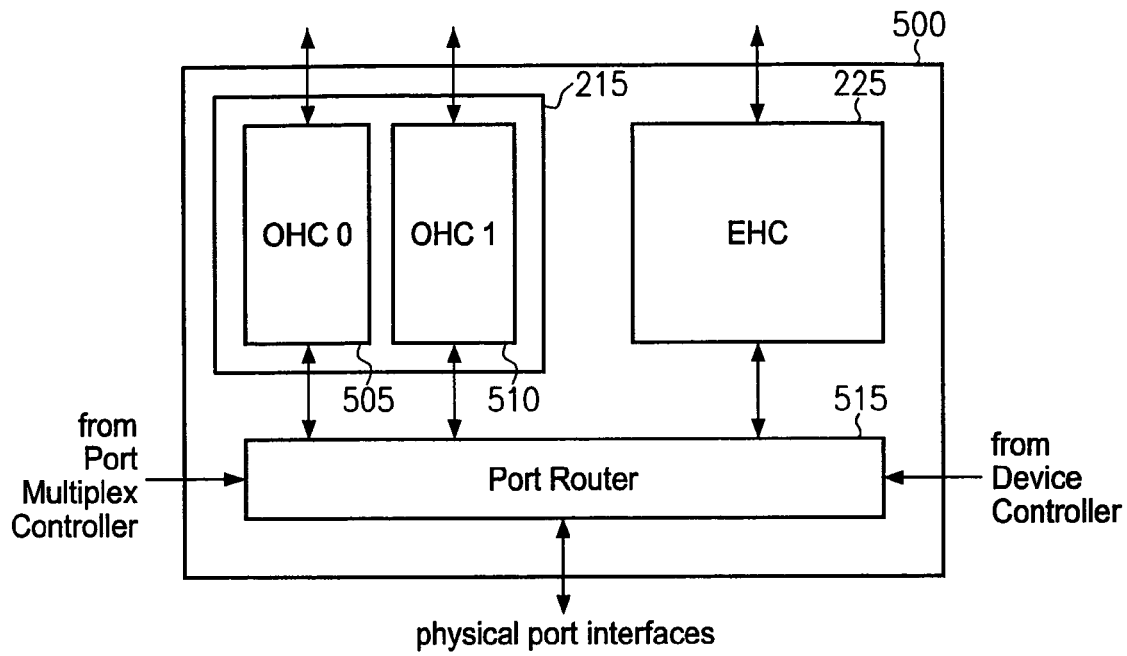
FIG. 5 is a block diagram illustrating the components of the host controller which is part of the arrangement of FIG. 4, according to an embodiment.

Referring to FIG. 5, the main components of the host controller 415 according to an embodiment are shown. In general, the host controller 415, 500 comprises three main components: the enhanced host controller (EHC) 225, one or more companion host controllers 215, and the port router 515.

The enhanced host controller 225 handles the USB 2.0 high speed traffic.

In the companion host controller unit 215 of the present embodiment, there are two OHCI compliant host controllers, OHC0 505 and OHC1 510. These controllers handle all USB 1.1 compliant traffic and may contain the legacy keyboard emulation for non-USB aware environments.

The port router 515 assigns the physical port interfaces their respective owners. If a USB 2.0 aware driver is present in the system it will assign the ports to either a companion host controller 505, 510 for low and full speed devices and hubs (USB 1.1 traffic) or to the EHC 225 for high speed devices and hubs.

That is, the USB 2.0 host controller shown in FIG. 5 complies with the EHCI specification and allows for using existing OHCI USB 1.1 host controllers with the minimum alteration necessary to interface to the port router block 515, instead of USB 1.1 physical devices.

The USB 2.0 compliant host controller of FIG. 5 may be defined as hardware architecture to implement an EHCI-compliant host controller for integration into a southbridge 310. The host controller then resides between the USB-2 analog input/output pins and a link interface module for interfacing upstream towards system memory, e.g. interfacing to a northbridge if there is one present in the system.

As can be seen from FIG. 5, the port router 515 has additional interfaces to the device control unit 410 and the port multiplex controller 420 (which includes the OTG controller 425 in the present embodiment). The interface to the device controller is the above-mentioned UTMI interface. The interface to the port multiplex controller is a control interface for host/device switching.

Referring back to FIG. 4, it may be the port multiplex controller's basic function in the present embodiment to assign the shared physical port to either the host control unit 415 or the device control unit 410. In the present embodiment, this assignment is done in response to software instructions received at the port multiplex controller 420.

To achieve its functionality, the port multiplex controller 420 of the present embodiment comprises software accessible registers such as a capability register and a multiplexing control register. Both registers may be accessible by software to read data from given register fields, and write data to such fields. It is to be noted, however, that at least some of the fields may be read-only fields.

In the port multiplex controller capability register, there may be a register field to store automatic pull-up enable information which may be used to control how pull-up registers of the USB controller device are activated when a port is assigned to the device control unit 410. The automatic pull-up enable information may indicate whether software needs to activate the pull-up, or whether the pull-up is activated as soon as the voltage on the USB port is in a valid voltage range.

There may be further register fields in the port multiplex controller capability register to store overcurrent polarities and information with respect to the overcurrent handling. For instance, information may be stored for controlling how the overcurrent reporting to certain statuses is handled. Moreover, the capability register may hold information on the port power polarity and handling for controlling how port power control information from the host controller is mapped.

A multiplexing control register of the port multiplex controller 420 may include register fields indicating whether the voltage on the USB port is in a valid range (i.e., above 4.4V), pull-up enable information indicating whether pull-up is disabled or activated, and port multiplexer control information indicating to which control unit a port is assigned, if any.

As described above, the OTG protocol support is implemented in the present embodiment as part of the port multiplex controller 420. This allows for using existing or off-the-shelf units to implement the controllers 410, 415. Further, the OTG control unit 425 of the present embodiment allows software to implement a part of the OTG state machines specified in the OTG supplement. To allow a USB software driver to implement a part of an OTG state machine, the OTG control unit 425 may provide status and control facilities which will now be described in more detail with reference to FIG. 6.

Figure 6:
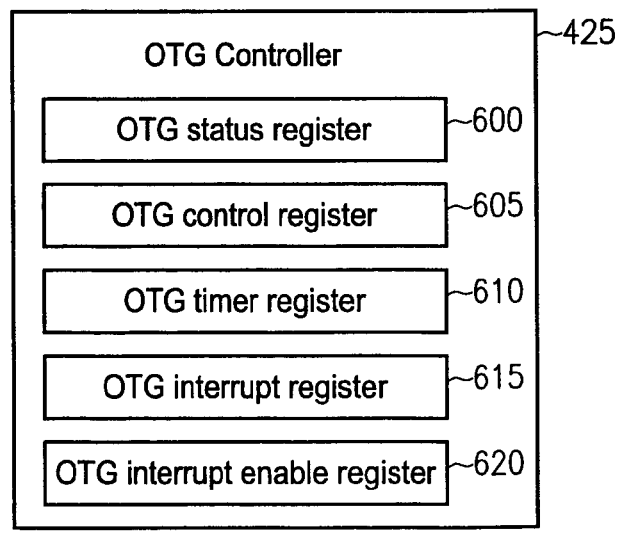
FIG. 6 illustrates an OTG controller according to an embodiment.

As apparent therefrom, the OTG control unit 425 has a number of registers 600-620 that are accessible by software in a read-only mode or in a write access mode. As shown in FIG. 6, the registers include an OTG status register 600, an OTG control register 605, an OTG timer register 610, an OTG interrupt register 615, and an OTG interrupt enable register 620.

Discussing first the OTG status register 600 which may be accessible by software in a read-only mode, the register holds status information of the OTG control unit 425 in a number of register fields.

In a first OTG status register field, timer expiration information may be stored. This information may be controlled by hardware to have a bit set when an OTG timer has expired. The bit may be deasserted when the timer is either currently counting or is in a stopped state.

In a further register field, the OTG status register 600 may hold port suspension information indicating whether a port assigned to the host control unit 415 or assigned to the device control unit 410 is suspended or is to be suspended by the respective control unit. In detail, when the port is assigned to host, the port suspension field bit may be set when the respective controller has suspended the port. When the port is assigned to device, the bit is set when the controller has detected a suspend condition on the bus.

Another register field of the OTG status register 600 may hold port connection information indicating an assignment of a port to the host control unit 415 or the device control unit

410. In detail, when the port is connected to host, the register field bit is set when the appropriate host controller has established a connection to a remote device. When the port is assigned to device, the bit is set when the device controller has been contacted by the remote host.

It is to be noted that the port connection register field bit may be overwritten at any time by software although this register field is accessible by software in a read-only mode only. To achieve this, the OTG control register 605 may include a (writeable) register field that may be used to overwrite the value of the OTG status register's port connection register field. This will be described in more detail below.

There may be further register fields in the OTG status register 600 to provide status information on the OTG control unit 425. For instance, there may be a register field storing FS (Full Speed) output enable information, port speed information, and information indicating whether certain line states or voltage values are reached.

Turning now to the OTG control register 605 which holds control information to control operation of the OTG control unit 425, there may again be a number of register fields. For instance, there may be a register field holding timer count condition information and control information with respect to whether a port is powered or not, is assigned to certain control units or not, or whether automatic or software controlled pull-up is enabled.

It is to be noted that some of the register fields of the OTG control register 605 may be aliased from the port multiplex controller registers discussed above, to facilitate both hardware implementation and software control of the OTG technology.

The OTG control register 605 may further comprise a write port connect register field holding write port connect information. As mentioned above, this register field may be used to override the value of the port connection register field of the OTG status register 600. That is, software may write to the write port connect register field of the OTG control register 605 to assert or deassert the respective register field bit of the OTG status register 600. This functionality allows for changing a port connection status by software even though the OTG status register 600 is a read-only register.

In detail, when the port is assigned to host, then the port connect status register field bit is asserted if the port is owned by the EHC and has been successfully brought into HS (High Speed) operational. Further, when the port is assigned to host, the status register bit may be asserted when the OHC has just detected a connect. When the port is assigned to device, the status register bit is asserted when downstream activity on the USB is detected. When the port is assigned to host, the status register bit is deasserted when the port is owned by the EHC and has just detected a disconnect. Similarly, the bit is deasserted when the OHC has just detected a disconnect. Moreover, the bit may be deasserted whenever the voltage of the USB port falls below 0.8V. All of this functionality may be achieved under hardware control.

The write port connect register field of the OTG control register 605 adds the possibility to change the status bit by software. This adds flexibility to the OTG control functionality, allowing software drivers to force the USB control device to enter specific port connection states.

Referring back to FIG. 6, the OTG control unit 425 may comprise further registers. For instance, the OTG timer register 610 may have register fields to store the current timer value (which may be read-only), and a preload value to preload for countdown. The OTG interrupt register 615 may store information in its fields indicating whether the timer has expired, port suspension or connections have changed, receiver activity is detected, the port speed has changed, an HS disconnect is detected, a line state has changed, or certain voltage ranges are fulfilled. The OTG interrupt enable register 620 may store interrupt enable information in its register fields indicating whether a global interrupt mechanism is enabled, or whether interrupts for which information is stored in the OTG interrupt register 615 are enabled.

Given the above description of the various embodiments, a USB controller device technique is provided to implement OTG functionality in a manner that allows for controlling the components by a state machine that can be implemented partly in hardware and partly in software. For this purpose, control and status information may be passed between the processor running the software driver, and the OTG control unit 425 through OTG status and control registers 600, 605 (and optionally other OTG registers). The control register bits control internal and external switches, and the status register bits indicate the state of relevant signals from the OTG control unit 425.

In an embodiment, the OTG control register 605 has two addresses. Writing to one address sets selected bits, while writing to the other address clears the selected bits. This scheme provides for maximum compatibility with other components of the USB controller device.

Further, register aliasing may be used to achieve as much flexibility as possible with respect to system configurations that may be chosen. For instance, a configuration may be chosen having a static port assignment, e.g. to provide nothing more than device functionality. In this case, the BIOS (Basic Input Output System) sets the port multiplexer accordingly at the time the computer system boots. The register contents is then never changed as long as the system is up. If, however, another configuration is chosen where the OTG functionality is used the USB port acts as device port or as host port depending on the user's requests, and this may change at any time. The port multiplexer is then served by an OTG driver. Thus, register aliasing allows for having BIOS accesses and OTG driver accesses separated also at the register level. This makes it possible for the BIOS to act without any knowledge on the OTG driver.

In an embodiment, the USB controller device may support the following USB configurations: (i) at least one host port and one peripheral device port, (ii) two or more host ports, and (iii) one dual-role device port and at least one additional host port. The dual-role device port may also be used as an SRP capable peripheral device port.

When configuring the USB controller device of the present embodiment to have one dedicated USB host port in addition to one dual-role device port, the software driver may maintain an OTG state machine that is separate from the host controller state machine.

As mentioned above, embodiments are provided that implement the OTG state machine(s) partly in hardware and partly in software. This may be achieved by implementing some of the states in hardware and other states in software. For instance, taking the example of a dual-role device state machine, the software driver may implement all of the states except for the a_suspend, a_peripheral, and b_wait_acon states. These three states may be then implemented in hardware. Further, the OTG state machine(s) may be implemented partly in hardware and partly in software by implementing some but not all of the state transitions specified by the OTG state machine(s) in software.

Figure 7:
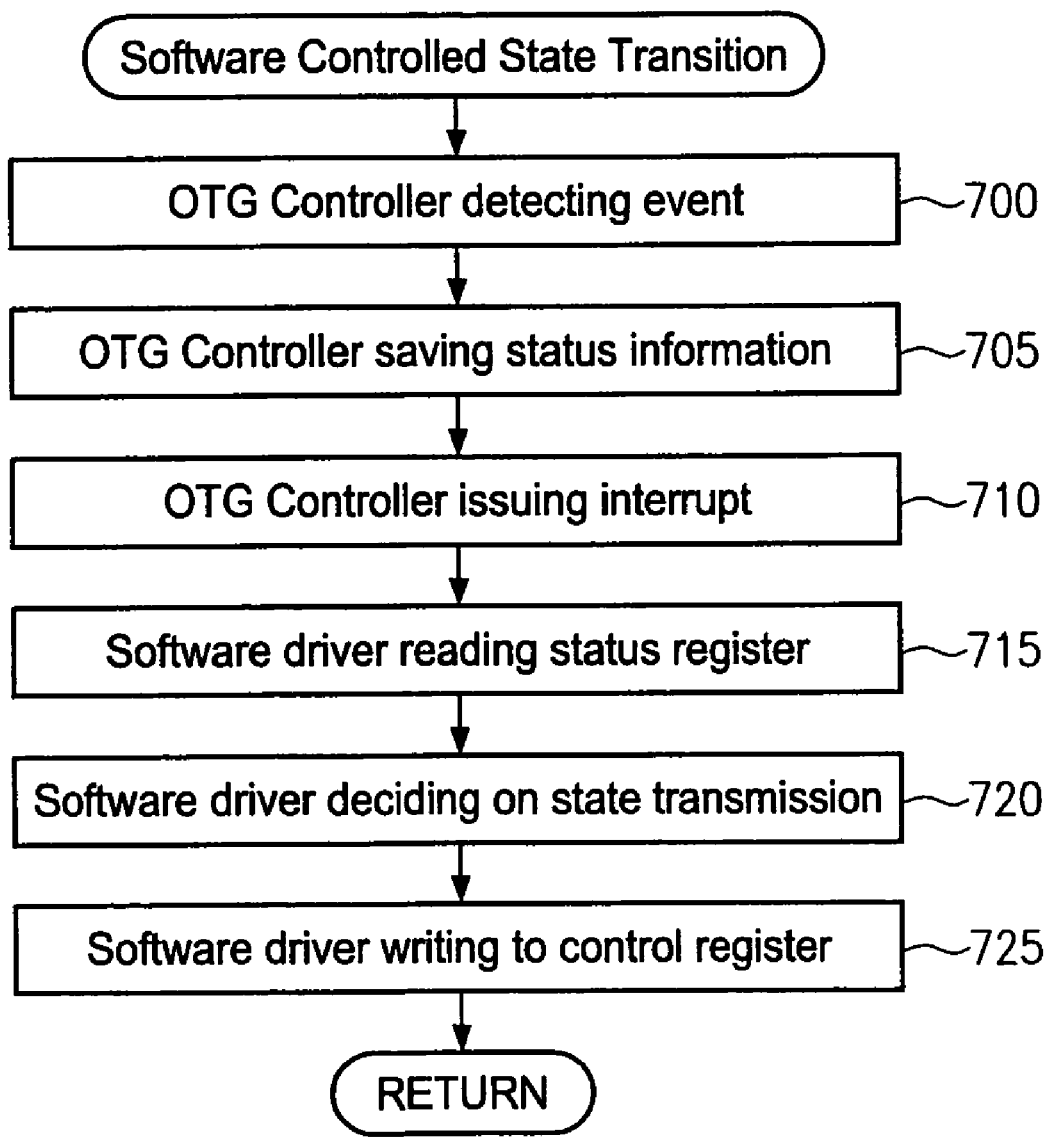
FIG. 7 is a flow chart illustrating how a software controlled state transition can be achieved according to an embodiment.

Referring now to FIG. 7, a flow chart is provided illustrating how a software controlled state transition may take place. In step 700, the OTG control unit 425 detects an event that may require the software state machine to change its state. The OTG control unit 425 then saves the respective status information in the OTG status register 600 (step 705) and issues an interrupt to the processor (step 710). In response to the interrupt, the USB software driver reads the status register in step 715, makes the appropriate state change based on the current state and the status register contents (step 720), and writes to the OTG control register 605 to change the switch settings, i.e., to make the appropriate changes to the OTG hardware (step 725).

While the invention has been described with respect to the physical embodiments constructed in accordance therewith, it will be apparent to those skilled in the art that various modifications, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. A USB (Universal Serial Bus) controller device having OTG (On-The-Go) functionality, the USB controller device comprising:
   a host control unit having an EHCI (Enhanced Host Controller Interface) compliant host controller adapted to implement host functionality to perform data transfer to and/or from at least one USB peripheral device;
   a device control unit adapted to implement device functionality to perform data transfer to and/or from a USB host device;
   a port multiplexer adapted to assign a physical port to either said host control unit or said device control unit, wherein said port multiplexer comprises a port multiplexer capability register adapted to store capability information indicating functional capabilities of said port multiplexer, said port multiplexer capability register being accessible by software; and
   an OTG control unit adapted to implement an OTG state machine to control operation of said host control unit, wherein said OTG control unit is adapted to implement said OTG state machine partly in hardware and partly in software;
   wherein said OTG control unit comprises an OTG control register adapted to hold control information to control operation of said OTG control unit, said OTG control register being accessible by software;
   wherein said OTG control register is writeable by software;
   wherein said OTG control unit further comprises an OTG status register adapted to hold status information of said OTG control unit, said OTG status register being readable by software; and
   wherein said OTG control unit is adapted to cause a software driver to read said OTG status register in response to a change of said status information.

2. The USB controller device of claim 1, wherein said OTG control unit is adapted to apply an interrupt mechanism to cause said software driver to read said OTG status register.

3. The USB controller device of claim 1, wherein said OTG control unit is adapted to have a part of said OTG state machine implemented by said software driver by allowing said software driver to read said OTG status register, perform a state transition in response thereto, and write control information to said OTG control register, said control information relating to the new state of said OTG state machine.

4. A USB (Universal Serial Bus) controller device having OTG (On-The-Go) functionality, the USB controller device comprising:
   a host control unit having an EHCI (Enhanced Host Controller Interface) compliant host controller adapted to implement host functionality to perform data transfer to and/or from at least one USB peripheral device;
   a device control unit adapted to implement device functionality to perform data transfer to and/or from a USB host device,
   a port multiplexer adapted to assign a physical port to either said host control unit or said device control unit, wherein said port multiplexer comprises a port multiplexer capability register adapted to store capability information indicating functional capabilities of said port multiplexer, said port multiplexer capability register being accessible by software; and
   an OTG control unit adapted to control operation of said host control unit, wherein said OTG control unit comprises:
      an OTG control register adapted to hold control information to control operation of said OTG control unit; and
      an OTG status register adapted to hold status information of said OTG control unit, wherein said OTG control and status registers are accessible by software;
   wherein said OTG control register is writeable by software; and
   wherein said OTG control unit is adapted to cause a software driver to read said OTG status register in response to a change of said status information.

5. The USB controller device of claim 4, wherein said OTG control unit is adapted to apply an interrupt mechanism to cause said software driver to read said OTG status register.

6. The USB controller device of claim 4, wherein said OTG control unit is adapted to have a part of an OTG state machine implemented by said software driver by allowing said software driver to read said OTG status register, perform a state transition in response thereto, and write control information to said OTG control register, said control information relating to the new state of said OTG state machine.

7. A USB (Universal Serial Bus) controller device comprising:
   a host control unit having an EHCI (Enhanced Host Controller Interface) compliant host controller adapted to implement host functionality to perform data transfer to and/or from at least one USB peripheral device;
   a device control unit adapted to implement device functionality to perform data transfer to and/or from at least one USB host device;
   a port multiplexer adapted to assign a physical port to either said host control unit or said device control unit, wherein said port multiplexer comprises a port multiplexer capability register adapted to store capability information indicating functional capabilities of said port multiplexer, said port multiplexer capability register being accessible by software; and
   an OTG (On-The-Go) control unit adapted to implement OTG functionality, wherein said OTG control unit is comprised in said port multiplexer;
   wherein said port multiplexer comprises a port multiplex controller, wherein the port multiplex controller comprises software accessible registers, and wherein said OTG control unit comprises registers aliased from said software accessible registers of said port multiplex controller; and
   wherein the register aliasing allows for having BIOS (Basic Input Output System) accesses and accesses by an OTG driver separated at a register level.

* * * * *